US012700992B1

(12) United States Patent
Aydin et al.

(10) Patent No.: US 12,700,992 B1
(45) Date of Patent: Aug. 4, 2026

(54) VALIDATING PUBLIC KEYS USED IN CLIENT CERTIFICATE WORKFLOWS

(71) Applicant: Amazon Technologies, Inc., Seattle, WA (US)

(72) Inventors: Nebi Mert Aydin, Odenton, MD (US); Kelly Anne Rooker, Ellicott City, MD (US); Martin C. Stonebraker, Sparks, MD (US); Karl Eric Anderson, Columbia, MD (US); Jacob A. Niebloom, Baltimore, MD (US); Joshua Kupershmidt, Somerville, MD (US)

(73) Assignee: Amazon Technologies, Inc., Seattle, WA (US)

( * ) Notice: Subject to any disclaimer, the term of this patent is extended or adjusted under 35 U.S.C. 154(b) by 806 days.

(21) Appl. No.: 17/936,786

(22) Filed: Sep. 29, 2022

(51) Int. Cl.
*H04L 9/08* (2006.01)
*H04L 9/32* (2006.01)

(52) U.S. Cl.
CPC .......... *H04L 9/0825* (2013.01); *H04L 9/0891* (2013.01); *H04L 9/3268* (2013.01); *H04L 9/3297* (2013.01)

(58) Field of Classification Search
None
See application file for complete search history.

(56) References Cited

U.S. PATENT DOCUMENTS

| | | |
|---|---|---|
| 7,930,415 B2 | 4/2011 | Gupta et al. |
| 9,882,728 B2 | 1/2018 | Grajek et al. |

| | | | |
|---|---|---|---|
| 2006/0036859 A1* | 2/2006 | Adams .................. | H04L 63/061 |
| | | | 713/171 |
| 2015/0013000 A1* | 1/2015 | Linnakangas ......... | H04L 63/168 |
| | | | 726/14 |
| 2017/0288880 A1* | 10/2017 | Brockhaus ............ | H04L 9/0891 |
| 2018/0205475 A1* | 7/2018 | Wendling ............... | H04H 60/23 |
| 2018/0337957 A1* | 11/2018 | Chen ..................... | H04L 9/3268 |
| 2020/0021448 A1* | 1/2020 | Chumbley .......... | H04L 63/0884 |
| 2021/0344668 A1* | 11/2021 | Limaye ............... | H04L 63/0823 |
| 2023/0179632 A1* | 6/2023 | Duraisamy ........... | H04L 9/3213 |
| | | | 726/9 |
| 2024/0073024 A1* | 2/2024 | Bertocci ............... | H04L 63/126 |
| 2025/0007736 A1* | 1/2025 | Kobayashi ............ | H04L 9/3247 |

OTHER PUBLICATIONS

Mike Malone, "If you're not using SSH certificates you're doing SSH wrong", Retrieved from https://smallstep.com/blog/use-ssh-certificates/, Sep. 11, 2019, pp. 1-15.

* cited by examiner

*Primary Examiner* — Bassam A Noaman
(74) *Attorney, Agent, or Firm* — Robert C. Kowert; Kowert, Hood, Munyon, Rankin & Goetzel, P.C.

(57) ABSTRACT

A key validation service may automatically determine whether an unauthorized public key was used by a client to log into a host using client-based authentication. This may allow the service to detect that an attack has occurred to circumvent the certificate workflow (e.g., tampering with the host security configuration file or using a replica of a trusted certificate authority). The service may do so by comparing the public key that was used by a client to a list of authorized public keys (e.g., public keys that are trusted by the service). When an unauthorized public key is detected, the service may provide a notification.

20 Claims, 6 Drawing Sheets

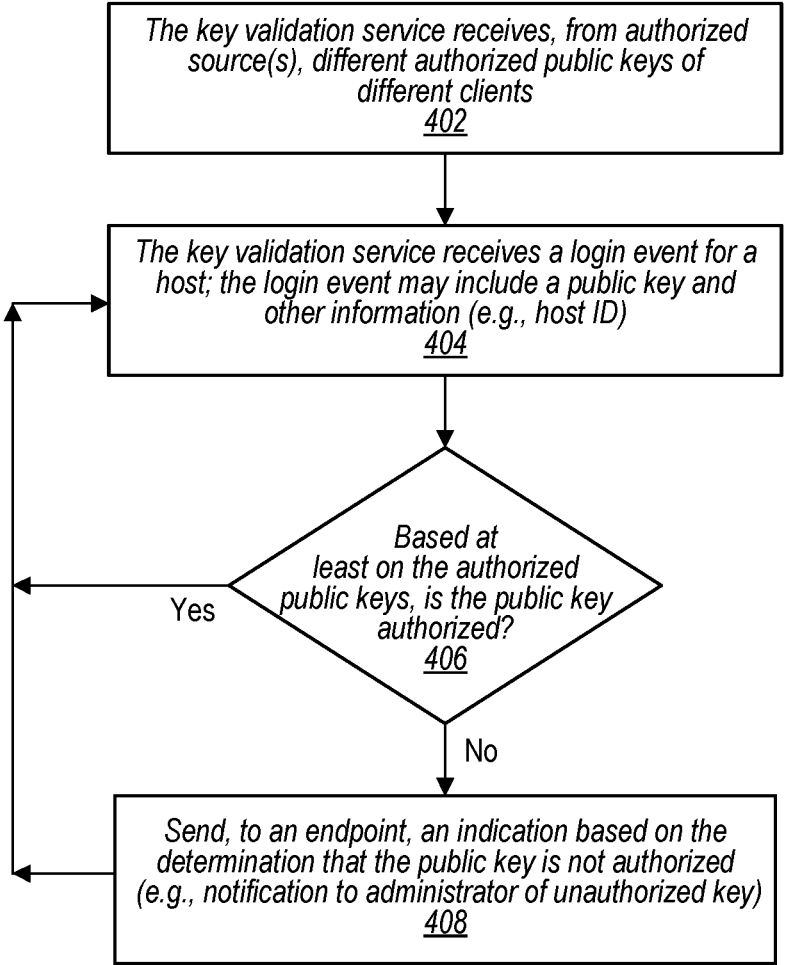

*The key validation service receives, from authorized source(s), different authorized public keys of different clients*
*402*

*The key validation service receives a login event for a host; the login event may include a public key and other information (e.g., host ID)*
*404*

*Based at least on the authorized public keys, is the public key authorized?*
*406*

Yes

No

*Send, to an endpoint, an indication based on the determination that the public key is not authorized (e.g., notification to administrator of unauthorized key)*
*408*

FIG. 4

VALIDATING PUBLIC KEYS USED IN CLIENT CERTIFICATE WORKFLOWS

BACKGROUND

As the number of software services and applications available to clients has grown, the use of client certificates (e.g., X.509 certificate) to authenticate clients has grown, due to the high level of security they provide, as well as their ease of use. For example, a client (e.g., a user or application) may send its own client certificate to a remote service provider in order to become authenticated for using a service/application provided by the remote service provider. The use of client certificates can be a much more convenient way of authenticating clients than the use of other traditional techniques (e.g., managing centralized lists of user-provided public keys).

In certain situations, a malicious actor may find a way of attacking a service provider by circumventing the client certificate workflow. For example, an attacker may alter a security configuration file at a host of the service provider network, allowing the use of unauthorized client certificates in order to gain unauthorized access to certain services. In some cases, an attacker may employ a rogue certificate authority (CA) in order to gain unauthorized access to a service.

BRIEF DESCRIPTION OF THE DRAWINGS

FIG. 4 is a flow diagram that illustrates validating client public keys in client certificate workflows, according to some embodiments.

Figure 1:
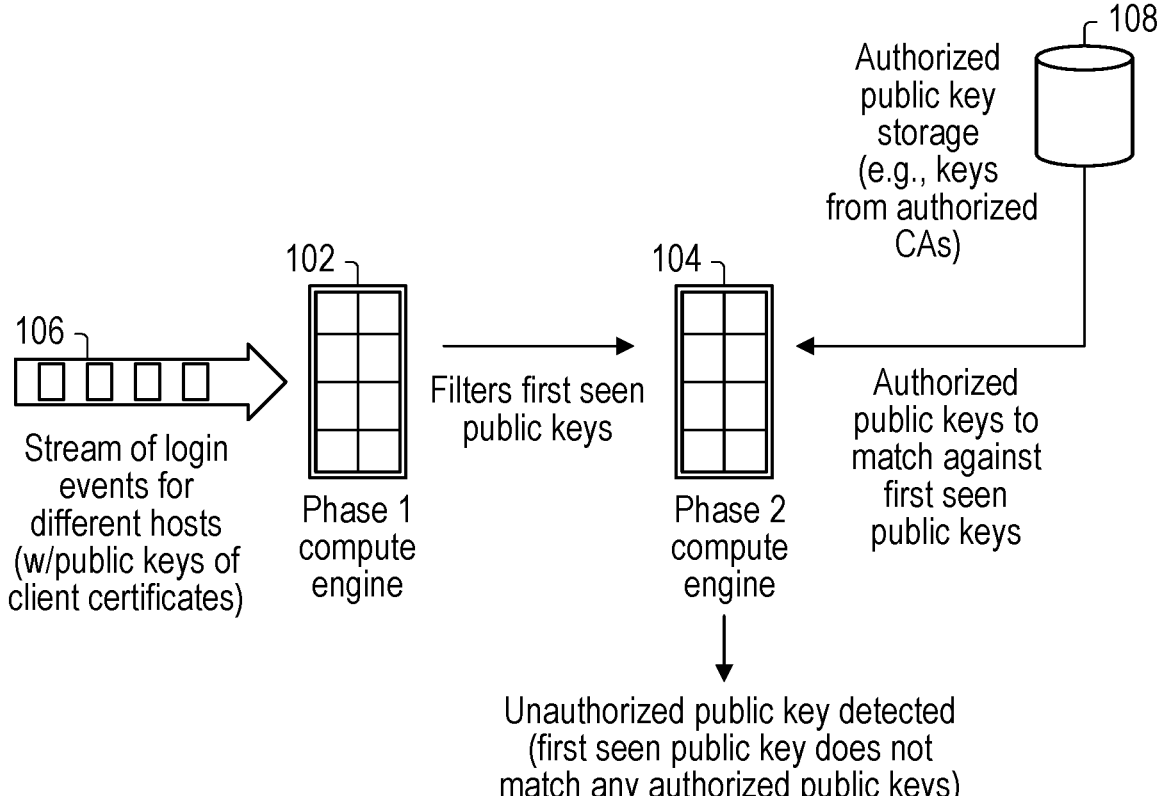
FIG. 1 illustrates a system for validating client public keys in client certificate workflows, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for validating client public keys in client certificate workflows. In various embodiments, in order for a client (e.g., a user or client application at a client's network) to establish a secure connection with a host (e.g., a host of a remote network of a service provider), the host may require the client to send a client certificate (e.g., an X.509 certificate) to the host as parts of the request to login/ establish a connection.

In embodiments, the client certificate includes a public key of the client (e.g., a unique encryption key generated and/or assigned for use by the client in accordance with a public key infrastructure (PKI) scheme). In embodiments, the client certificate that is provided to the host has been signed and/or issued by a certificate authority (CA), which may be a third-party entity that has signed the client certificate using its own private key that is inaccessible outside of the entity.

When a host of the provider network receives a request from the client to establish a connection (e.g., login) according to a secure communication protocol/scheme (e.g., secure shell (SSH) or transport layer security (TLS)), the host may authenticate the client by verifying the digital signature of the CA on the client certificate that is provided by the client as part of the connection request. Various embodiments describe how the public key of a client certificate may be validated by the service provider (e.g., by another service/ application of the service provider that is external to the host). In embodiments, validating a public key of a client may include verifying that the public key is an authorized public key (e.g., a public key that has been signed by an authorized/approved/trusted source, such as one or more particular CAs)

With the growing popularity of certificate workflows (e.g., SSH, TLS), organizations started to switch to the use of CAs to issue and sign user credentials (e.g., a client certificate that includes the client's public key), instead of managing centralized lists of user-provided public keys. In embodiments, certificates (e.g., SSH certificates) may allow system administrators to scope access (e.g., SSH access) to certain principals and prevents the need to store static public keys of clients at the host to authenticate clients.

In certificate workflows, a client first authenticates with the CA using the client's public key. Then, an additional authorization system may be used to check if access should be granted to the user. In the case of authorization, the CA signs the certificate with its private key. Hosts don't have to store clients' (users') public keys, but only the CA's public key. This way of onboarding new clients to access (e.g., SSH access or TLS access) can be scalable.

In order for a CA to sign a certificate, the CA may need the public key of a client and additional metadata. In certificate workflows, public key creation on the client side may be automated through a command line interface (CLI). In embodiments, public key creation may result in a new and randomly-generated public key every time a client wants to access a host (e.g., SSH access or TLS access).

Randomized client public key creation may introduce challenges/problems if an owner/administrator of a host wishes to validate that the public key generated from the authorization process is the same one used to by a client to login to the authorized system. In various embodiments, a lightweight multi-stage model may detect host authorization tampering by validating cross-system events and/or event sequences.

In embodiments, the first phase may include creating a baseline of new login events (e.g., SSH login events) based on host identifiers and/or other data/identifiers associated with the host (e.g., client ID, account ID). The goal of an owner/administrator may be to detect if a login event with a user's public key has never been seen before for a given host. In embodiments, those events may be identified as candidates (e.g., candidates for being an unauthorized login event and/or anomalous login event). The second phase may include storing an incoming stream of authorized public keys from authorized key creation events (e.g., authorized public keys created by one or more authorized Cas).

In embodiments, the second phase may further include filtering down the first phase's unauthorized (or anomalous) candidates by checking if the public keys of the candidates are coming from a known trusted authorization process (e.g., authorized CA) by matching unauthorized/anomalous candidates from the first phase against stored authorized public keys from authorized system. The second phase may filter down the first phase's unauthorized/anomalous candidates by checking if the public keys of the candidates are coming from a known trusted authorization process by ingesting a stream of new key creation events. Some embodiments may be used to validate authorization as an additional security layer for TLS since both TLS workflows and SSH workflows use a similar certificate signing process from CAs.

FIG. 1 illustrates a system for validating client public keys in client certificate workflows based on authorized public keys, according to some embodiments.

In various embodiments, any type of suitable computing system may be used to implement validating client public keys in client certificate workflows. For example, any number of computing devices of a service provider network may be used to implement validating client public keys in client certificate workflows, as described for FIG. 3. However, any other computing system and/or network may be used (e.g., computing devices/servers within a network owned/managed by any type of business, person, or other entity).

As shown, the system may implement a phase 1 compute engine 102 and a phase 2 compute engine 104. The phase 1 compute engine may obtain login events from a stream 106 of login events for different hosts (e.g., remote and/or local hosts with respect to the network of the system). The phase 1 compute engine may filter first seen public keys, which are sent on to phase 2 (e.g., as candidate unauthorized public keys).

For example, if phase 1 determines, based on an obtained login event, that a particular public key was used by a client to be authenticated by a host and that same public key was already used previously by the client to be authenticated by the host, then phase 1 will not send the particular public key to phase 2. Therefore, phase 1 may be used to reduce the number of public keys that need to be evaluated by phase 2. Note that in some embodiments, the system may not include the phase 1 compute engine.

As depicted, the phase 2 compute engine may also receive any number of authorized public keys from an authorized public key storage 108 (e.g., public keys that were obtained from one or more authorized CAs). The phase 2 compute engine may compare a given first seen public key (candidate unauthorized public key) against the authorized public keys in order to determine if the first seen public key matches one of the authorized public keys.

In embodiments, if the first seen public key matches one of the authorized public keys does not match any of the authorized public keys, then the phase 2 compute engine may determine that the first seen public key is an unauthorized public key. In embodiments, the phase 2 compute engine may send an indication (e.g., notification) to an endpoint based on the determination. For example, the phase 2 compute engine may send, to an endpoint, an indication that an unauthorized public key was detected for the host.

Figure 2:
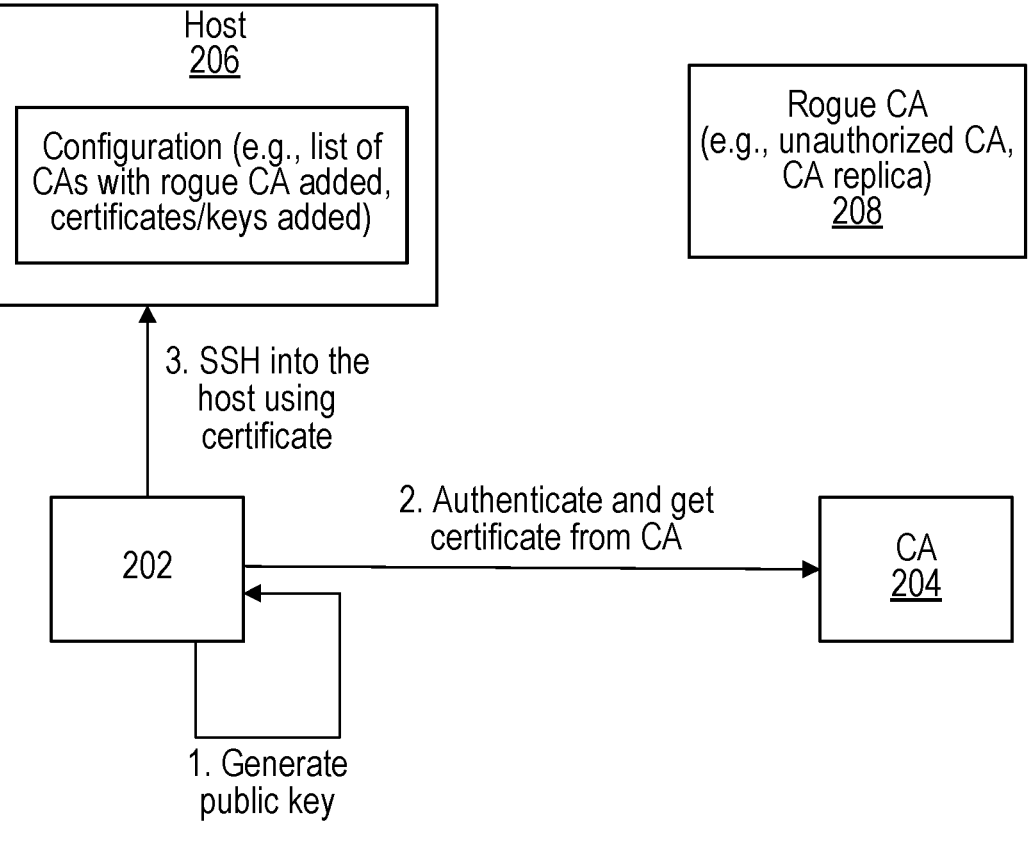
FIG. 2 illustrates examples of techniques for circumventing certificate workflows through the use of unauthorized public keys, according to some embodiments.

FIG. 2 illustrates examples of techniques for circumventing certificate workflows through the use of unauthorized public keys, according to some embodiments.

In the depicted example, a client (e.g., a user of the client device 202 or an application running on the client device 202) may cause the client device to generate a public key. For example, the user may generate a request to generate a public key using a CLI or an application may generate a request to generate a public key in response to detecting an event or receiving a command.

In embodiments, the client may then cause the client device to send a request to the CA 204 for a signed certificate (e.g., a certificate signing request (CSR)). For example, the user may generate the request using a CLI or an application may generate the request in response to detecting an event or receiving a command. The request may include a certificate that includes the generated public key and additional metadata provided by the client (e.g., a name and/or IDs). The CA may authenticate the client (e.g., based on satisfying one or more criteria imposed by the CA), sign the certificate using the CA's private key, and send the signed certificate to the client (e.g., by sending it to the client device).

The client may then send a request to the host 206 to log into the host 206 using the signed certificate (e.g., SSH into the host). The request may include the signed certificate. In response to receiving the request, the host may determine, based on a public key provided to the host by the CA 204, whether the signed certificate was signed by the CA 204 (e.g., based on the public key provided by the CA 204 and the digital signature of the signed certificate).

If the host determines that the signed certificate was signed by the CA 204, then the host may authenticate the client based on the signed certificate. In response to authenticating the client based on the signed certificate, the host may also send the public key of the signed certificate to be processed by the phase 1 compute engine and/or the phase 2 compute engine, as described for FIG. 1.

As shown, an attacker may circumvent the certificate workflow in different ways. For example, an attacker may gain unauthorized access to the host 206 and modify the configuration of the host by adding a rogue CA 208 to a list of approved CAs that may be used as part of the certificate authentication process described above. This may allow the attacker to sign a certificate using the rogue CA 208 and use the signed certificate to be authenticated by the host 206 and to log in/gain access to the host and/or other systems in the host's network.

In some cases, an attacker may gain unauthorized access to the host 206 and modify the configuration of the host by adding new certificates and/or public keys to be used as part of the certificate authentication process described above. For example, the attacker may sign a certificate using a private key that corresponds to the newly added public key at the host, so that the certificate is authenticated when presented to the host based on the newly added public key at the host. In embodiments, an attacker may circumvent the certificate workflow is by obtaining the private keys of an approved/authorized CA 204 and then creating a duplicate/replica CA (e.g., rogue CA 208) that can be used by the attacker to sign certificates, which can be authenticated when presented to the host.

Figure 3:
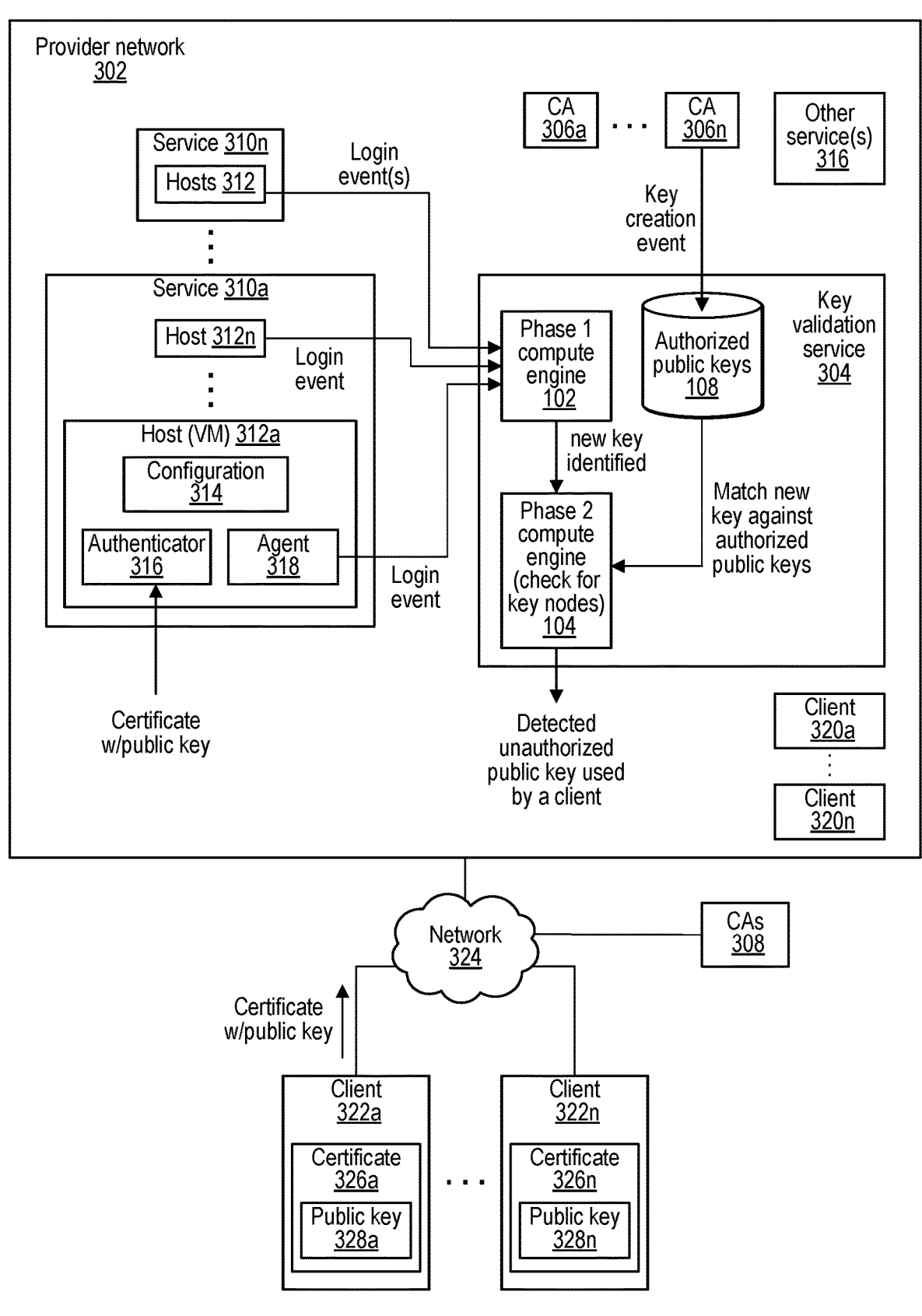
FIG. 3 illustrates a system for validating client public keys in client certificate workflows, according to some embodiments.

FIG. 3 illustrates a system for validating client public keys in client certificate workflows, according to some embodiments.

In embodiments, the provider network 302, the key validation service 304, and/or any other components depicted in FIG. 3 may be the same as (or include one or more of the same components) as any of the components depicted in any of FIG. 1-2 or 3-5. FIG. 6 depicts an example computer system(s) that may implement the services, networks, and/or any other components depicted in any of FIGS. 1-5.

In the depicted embodiment, the service provider network 302 includes a key validation service 304 that may validate client public keys in client certificate workflows. The key validation service 304 includes the phase 1 compute engine 102, the phase 2 compute engine 104, and the authorized public keys 108, as described in FIG. 1.

As shown, the authorized public keys may be obtained from any number of authorized CAs 306 of the provider network and/or any number of external CAs 308 of remote networks. The provider network 302 also includes any number of services 310, that each may implement any number of hosts 312. In embodiments, the hosts of a given service may be physical servers and/or may be virtual machines (VMs) implemented by one or more physical servers.

A given host may have a configuration 314 (as discussed in FIG. 2). A host may also include an authenticator 316 that performs authentication of clients based on client certificates. A host may also include an agent 318 that sends the public keys of certificates that were used to authenticate clients to the key validation service (e.g., as part of a login event).

In some embodiments, the host (e.g., agent 318) may send the public keys to another destination instead of directly to the key validation service. For example, the agents of the different hosts may send login events to a data store (e.g., a data store provided by one of the other services 316) and the key validation service may obtain the login events from the data store as a stream of login events. In various embodiments, the data store/data storage service may push the stream of login events to the key validation service or the key validation service may pull/query login events from the data store/data storage service to create the stream of login events.

In the example embodiment, a given host may perform certificate-based authentication for any number of internal clients 320 (within the network 302) and/or any number of remote clients 322. The remote clients 322 and the CAs 308 may communicate with the provider network 302 via a wide are network 324 (e.g., internet). Each client 320 or 322 may obtain a signed certificate 326 that includes a public key 328 and metadata (e.g., as described for FIG. 2).

The provider network 302 may also include any number of other services 330. In embodiments, the key validation service 304 may use any of the functionality of any of the other services to perform any of the described actions for validating client public keys in client certificate workflows. For example, the service 304 may use another compute service to perform some of the actions of the compute engines 102, 104 or may use a storage service to store some or all of the authorized public keys.

FIG. 4 is a flow diagram that illustrates validating client public keys in client certificate workflows, according to some embodiments.

At block 402, the key validation service receives, from authorized source(s), different authorized public keys that were signed by one of the authorized source(s). In various embodiments, the authorized source(s) may include CAs and/or any other type of source capable of authorizing public keys for use by clients (e.g., services, software applications).

At block 404, the key validation service receives a login event for a host; the login event may include a public key and may include other information (e.g., host ID).

At block 406, the key validation service determines, based at least on the authorized public keys, whether the public key is an authorized public key (e.g., by determining whether the public key of the login event matches any of the authorized public keys). If so, then the process returns to block 404 to process another event. If the key validation service determines that the public key is not an authorized public key, then at block 408, the service sends, to an endpoint, an indication based on the determination that the public key is not authorized (e.g., notification to administrator of unauthorized key). The process then returns to block 404 to process another login event.

Figure 5:
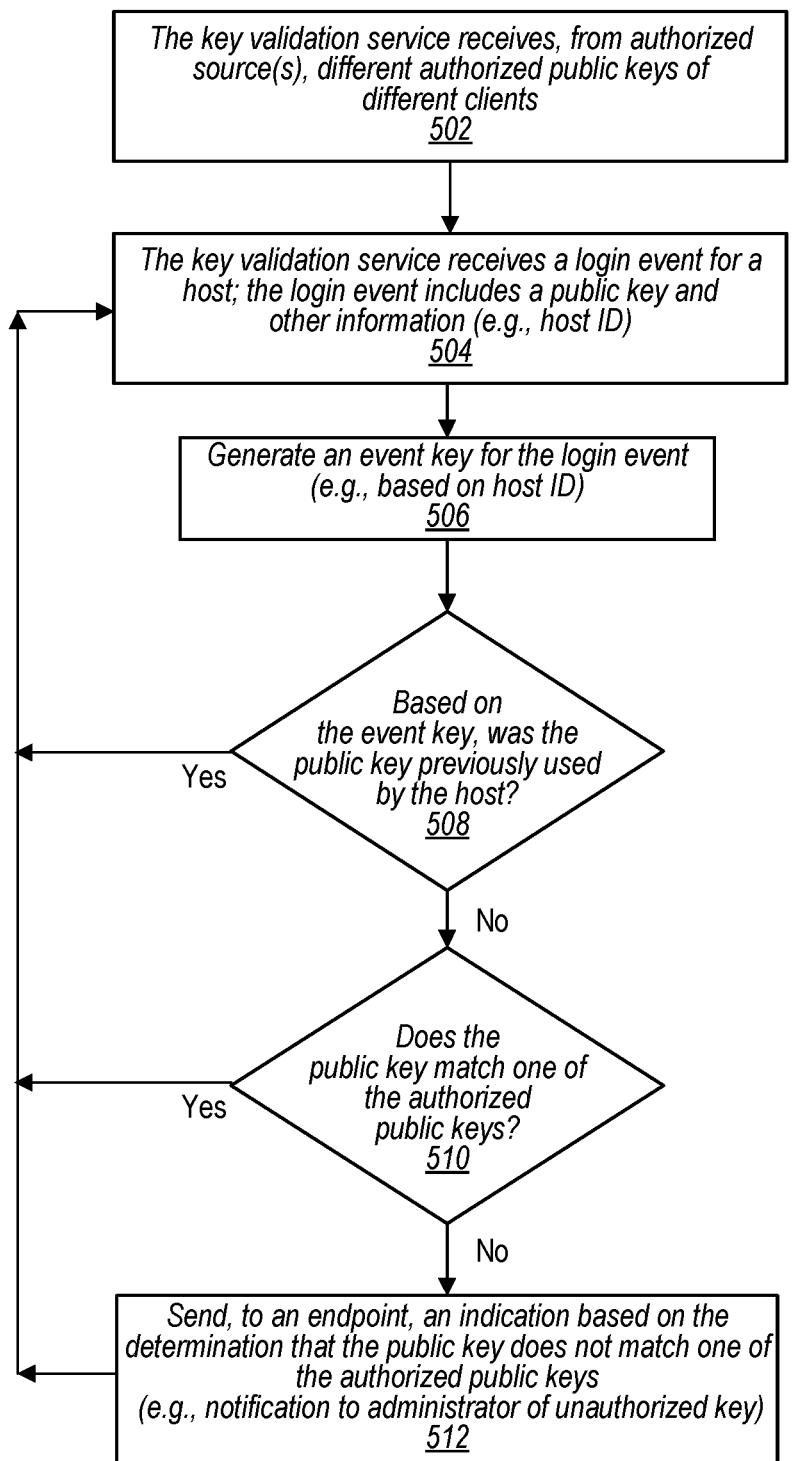
FIG. 5 is a flow diagram that illustrates validating client public keys in client certificate workflows for public keys that have not been previously used, according to some embodiments.
Figure 6:
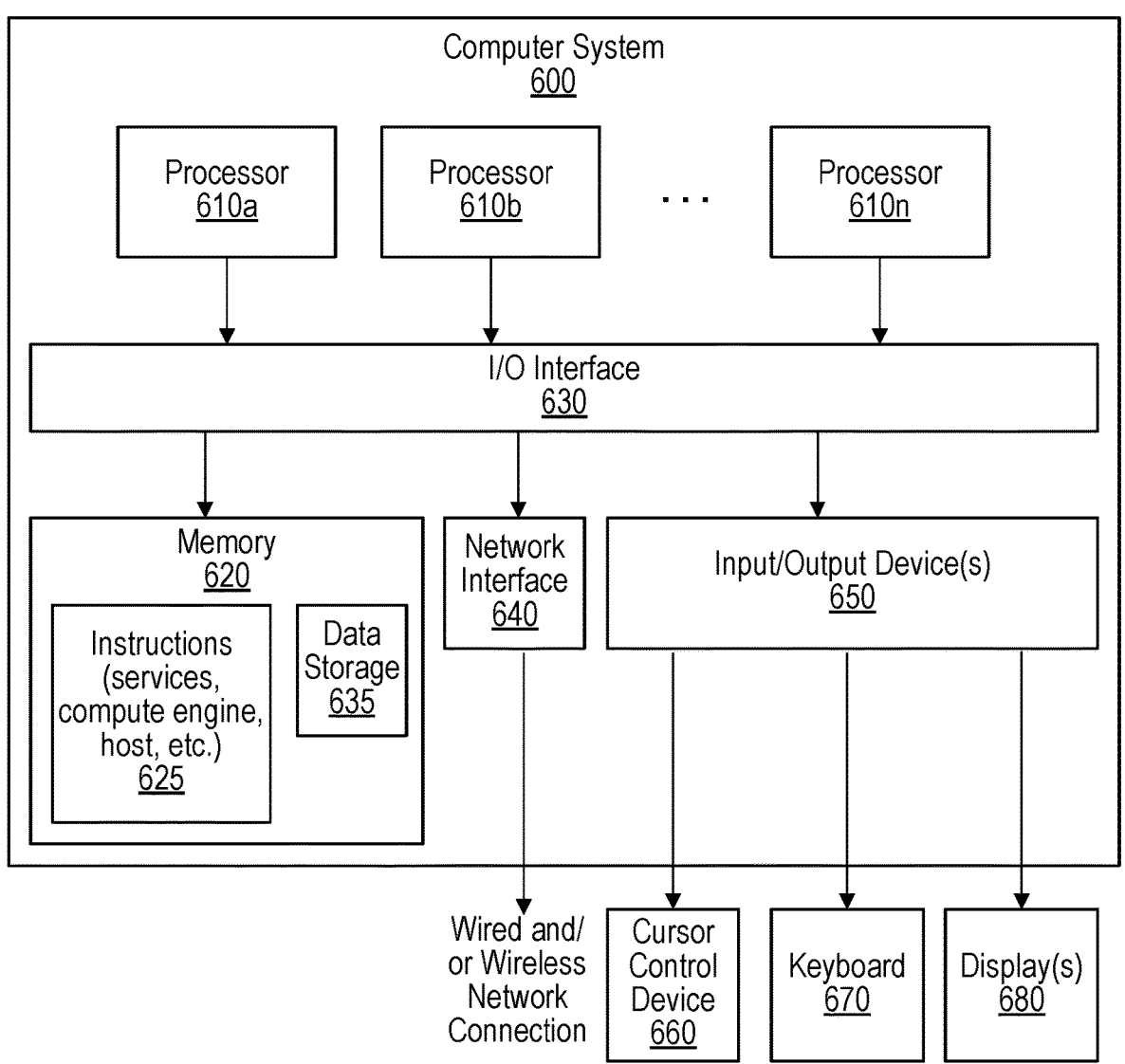
FIG. 6 is a block diagram illustrating an example computer system that implements some or all of the techniques described herein, according to some embodiments.

FIG. 5 is a flow diagram that illustrates validating client public keys in client certificate workflows for public keys that have not been previously used, according to some embodiments.

At block 502, the key validation service receives, from authorized source(s), different authorized public keys of different clients. In various embodiments, the authorized source(s) may include CAs and/or any other type of source capable of authorizing public keys for use by clients (e.g., services, software applications). At block 504, the key validation service receives a login event for a host; the login event may include a public key and may include other information (e.g., host ID).

At block 506, the key validation service generates an event key for the login event (e.g., based on the host ID, client account ID, and/or other data). At block 508, the service determines, based on the event key, whether the public key was previously used by the host (e.g., based on an event history that indicates previously used public keys). If so, then the process returns to block 504 to process another login event. If the service determines that the public key was not previously used by the host, the process proceeds to block 510.

At block 510, the service determines, based at least on the authorized public keys, whether the public key matches one of the authorized public keys (e.g., to determine if it is an authorized public key). If so, then the process returns to block 504 to process another event.

If the service determines that the public key does not match one of the authorized public keys, then at block 512, the service sends, to an endpoint, an indication based on the determination that the public key does not match one of the authorized public keys (e.g., notification to administrator of the use of the unauthorized key). The process then returns to block 504 to process another login event.

Although systems and methods described herein implement techniques for validating client public keys in client certificate workflows, in various embodiments the same or similar techniques may be used in other authentication workflows that use public/private key pairs. For example, the various techniques described herein may be used for validating client public keys that are used by clients to gain access to hosts based on any type of public key authentication scheme (e.g., SSH or other authentication scheme that uses asymmetric (public key) cryptography with a unique public/private key pair generated for each client, where a client signs data with the client's private key and a host receives the signature and authenticates the client by verifying the signature with the client's public key).

As discussed herein, in various embodiments, a key validation service/system may receive, from one or more authorized sources (e.g., CAs), any number of key creation events. The key creation events may respectively include an authorized public key that was provided by one of the authorized sources (e.g., CAs) to a client as part of a client certificate that was signed by the authorized source using a private key of the authorized source.

In embodiments, an input stream may include login events for any number of different hosts. For each login event of an input stream, the key validation service/system may: receive the login event (the login event may include a public key that was provided by a client (e.g., as part of a client certificate) to one of the hosts for authentication of the client); determine whether the public key was previously used by the host to authenticate the client; in response to a determination that the public key was not previously used by the host to authenticate the client, determine, based on key creation events received from one or more authorized sources, whether the public key is an authorized public key or an unauthorized public key; and in response to a determination that the public key is an unauthorized public key, send, to an endpoint, an indication based on the determination that the public key is unauthorized (e.g., send a notification to an administrator).

In some embodiments, to determine that the public key was not previously used by the host to authenticate the client, the service determines, based on an event key for the login event and an event history (e.g., a lookup table), that the public key was not previously used by the host. In embodiments, an event key may include an identifier of the host and/or an account identifier for the client that was authenticated by the host.

In embodiments, to determine, based on an event key for the login event and an event history (e.g., a lookup table), that the public key was not previously used by the host, the service may perform a lookup on a lookup table using the event key or a hash of the event key and determine that the event key or hash does not match any of the entries of the lookup table. In response, the service may insert, into the lookup table, an entry that includes the event key and/or a hash of the event key. In some embodiments, the service may expire/remove the entry if another event with a matching event key and/or matching hash is not received after a threshold amount of time has passed since the entry was inserted.

In various embodiments, the service may perform anomaly detection for public keys that are not new. For example, in response to a determination that the public key indicated by a login event was previously used by a host to authenticate a client, the service may determine, based on satisfaction of one or more criteria, that the login event is an anomalous event. In embodiments, the one or more criteria may include: a geographic location of the client indicated by the login event is within one or more unauthorized locations, or an amount of time since the public key was previously used by the host to authenticate the client exceeds a threshold amount of time.

Various other suitable criteria may also be used, in embodiments. In response to the determination that the login event is an anomalous event, the service may send, to the endpoint, an indication based on the anomalous event (e.g., a notification of the anomalous login/public key that was used).

In embodiments, any number of different actions may be performed in response to the service determining that a public key is an unauthorized public key. For example, the service may cause the host to be quarantined and/or end one or more sessions that are based on authentication of a certificate that uses the public key.

In some embodiments, the initial filtering phase (e.g., phase 1) may not be implemented by a key validation service/system. For example, after receiving a login event from an input stream of login events, the service may determine, based on a plurality of authorized public keys, whether the public key is an authorized public key or an unauthorized public key; and in response to determining that the public key is an unauthorized public key, the service sends, to an endpoint, an indication based on the determination that the public key is unauthorized. The use of a filtering stage may not be needed if the rate of events sent in an event stream is below a threshold rate and/or if there is a threshold amount of computing resources such that all of the public keys for all of the login events can be compared against the authorized public keys.

Any of various computer systems may be configured to implement processes associated with the services, networks, or any components of the above figures. For example, FIG. 6 is a block diagram illustrating an example computer system that implements some or all of the techniques described herein, according to some embodiments.

In various embodiments, the services, networks, or any components of any of FIGS. 1-5 may each include one or more computer systems 600 such as that illustrated in FIG. 6. In embodiments, the services, networks, or any components may include one or more components of the computer system 600 that function in a same or similar way as described for the computer system 600.

In the illustrated embodiment, computer system 600 includes one or more processors 610 coupled to a system memory 620 via an input/output (I/O) interface 630. Computer system 600 further includes a network interface 640 coupled to I/O interface 630. In some embodiments, computer system 600 may be illustrative of servers implementing enterprise logic or downloadable application, while in other embodiments servers may include more, fewer, or different elements than computer system 600.

In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be embedded processors implementing any of a variety of instruction set architectures (ISAs), such as the x 106, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor 610. In various embodiments, system memory 620 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above (e.g., for the certificate revocation manager, the services, etc.), are shown stored within system memory 620 as program instructions 625. In some embodiments, system memory 620 may include data 635 which may be configured as described herein.

In one embodiment, I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610).

In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

Network interface 640 may be configured to allow data to be exchanged between computer system 600 and other computer systems 600 or devices attached to a network, such as the local network discussed above, a wide-area network, or a local network within the provider network, for example. In particular, network interface 640 may be configured to allow communication between computer system 600 and/or various I/O devices 650. I/O devices 650 may include scanning devices, display devices, input devices and/or other communication devices, as described herein.

Network interface 640 may commonly support one or more wireless networking protocols (e.g., Wi-Fi/IEEE 802.11, or another wireless networking standard). However, in various embodiments, network interface 640 may support communication via any suitable wired or wireless general data networks, such as other types of Ethernet networks, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 600 via I/O interface 630.

A computer-readable storage medium may also include any volatile or non-volatile media such as RAM (e.g., SDRAM, DDR SDRAM, RDRAM, SRAM, etc.), ROM, etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

In some embodiments, I/O devices 650 may be relatively simple or "thin" client devices. For example, I/O devices 650 may be configured as dumb terminals with display, data entry and communications capabilities, but otherwise little computational functionality. However, in some embodiments, I/O devices 650 may be computer systems configured similarly to computer system 600, including one or more processors 610 and various other devices (though in some embodiments, a computer system 600 implementing an I/O device 650 may have somewhat different devices, or different classes of devices).

In various embodiments, I/O devices 650 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 650 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 600. In general, an I/O device 650 (e.g., cursor control device 660, keyboard 670, or display(s) 680 may be any device that can communicate with elements of computing system 600.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the services, hosts, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:

one or more processors and one or more memories, wherein the one or more memories have stored thereon instructions, which when executed by the one or more processors, cause the one or more processors to implement a key validation service of a provider network, wherein the key validation service is configured to:

receive, from one or more authorized certificate authorities (CAs), a plurality of key creation events that respectively comprise an authorized public key that was provided by one of the authorized CAs to a given client as part of a given client certificate that was signed by the authorized CA using a private key of the authorized CA; and for individual login events of an input stream, wherein the input stream comprises login events for different hosts:

receive the login event, wherein the login event comprises a public key that was provided by a client to one of the hosts for authentication of the client;

determine whether the public key that was used for the authentication of the client by the host was also used by the host to authenticate the client prior to the authentication of the client by the host indicated by the received login event of the input stream;

in response to a determination that the public key used for the authentication of the client was not also used by the host to authenticate the client prior to the authentication of the client indicated by the received login event of the input stream, determine, based on the authorized public keys of the plurality of key creation events received by the provider network from the one or more authorized CAs, whether the public key that was used for the authentication of the client by the host is an authorized public key or an unauthorized public key; and in response to a determination that the public key is an unauthorized public key, send, to an endpoint, an indication based on the determination that the public key is unauthorized.

2. The system as recited in claim 1, wherein to determine that the public key was not previously used by the host to authenticate the client, the key validation service is further configured to:

determine, based on an event key for the login event and an event history, that the public key was not previously used by the host.

3. The system as recited in claim 2, wherein the key validation service is further configured to:

update the event history based on the event key for the login event.

4. The system as recited in claim 1, wherein the key validation service is further configured to:

in response to a determination that the public key was previously used by the host to authenticate the client, determine, based on satisfaction of one or more criteria, that the login event is an anomalous event; and in response to the determination that the login event is an anomalous event, send, to the endpoint, an indication based on the anomalous event.

5. The system as recited in claim 4, wherein the one or more criteria comprises:

a geographic location of the client indicated by the login event is within one or more unauthorized locations, or an amount of time since the public key was previously used by the host to authenticate the client exceeds a threshold amount of time.

6. A method, comprising:

performing, by one or more computing devices of a provider network:

for individual login events of an input stream, wherein the input stream comprises login events for different hosts:

receiving the login event, wherein the login event comprises a public key that was provided by a client to one of the hosts for authentication of the client;

determining that the public key that was used for the authentication of the client by the host was not also used by the host to authenticate the client prior to the authentication of the client indicated by the received login event of the input stream, wherein a given authorized public key of a plurality of authorized public keys was provided by an authorized source to a given client as part of a given client certificate that was signed by the authorized source using a private key of the authorized source;

in response to determining that the public key that was used for the authentication of the client by the host was not also used by the host to authenticate the client prior to the authentication of the client indicated by the received login event of the input stream, determining, based on the plurality of authorized public keys provided by the authorized source to the provider network, that the public key that was used for the authentication of the client by the host is an unauthorized public key; and in response to determining that the public key is an unauthorized public key, sending, to an endpoint, an indication based on the determination that the public key is unauthorized.

7. The method as recited in claim 6, wherein determining that the public key is an unauthorized public key comprises:

determining that none of the plurality of authorized public keys matches the public key.

8. The method as recited in claim 6, further comprising performing, by the one or more computing devices:

receiving another login event of the input stream, wherein the other login event comprises another public key that was provided by another client to another of the hosts for authentication of the other client;

determining that the other public key was not previously used by the other host to authenticate the client; and determining, based on the plurality of authorized public keys, that the other public key is an unauthorized public key.

9. The method as recited in claim 6, wherein determining that the public key was not previously used by the host to authenticate the client comprises:

determining, based on an event key for the login event and an event history, that the public key was not previously used by the host.

10. The method as recited in claim 9, wherein the event history comprises a lookup table, and further comprising performing, by the one or more computing devices:

inserting, into the lookup table, an entry comprising the event key or a hash of the event key.

11. The method as recited in claim 9, wherein the event key comprises one or more of an identifier of the host or an account identifier for the client.

12. The method as recited in claim 6, wherein the one or more authorized sources comprises one or more CAs.

13. The method as recited in claim 6, wherein the host comprises a virtual machine implemented by a service of the provider network.

14. The method as recited in claim 13, further comprising performing, by the one or more computing devices:

receiving another login event of the input stream, wherein the other login event comprises another public key that was provided by another client to another of the hosts for authentication of the other client;

determining that one of the plurality of authorized public keys matches the public key; and in response to determining that the authorized public key matches the public key, determining that the public key is an authorized public key.

15. One or more non-transitory computer-accessible storage media storing program instructions that when executed on or across one or more processors of a provider network cause the one or more processors to:

receive, from one or more authorized sources, a plurality of authorized public keys, wherein a given authorized public key of the plurality of authorized public keys was provided by an authorized source to a given client as part of a given client certificate that was signed by the authorized source using a private key of the authorized source;

for individual login events of an input stream, wherein the input stream comprises login events for different hosts:

receive the login event, wherein the login event comprises a public key that was provided by a client to one of the hosts for authentication of the client;

determine that the public key that was used for the authentication of the client by the host was not also used by the host to authenticate the client prior to the authentication of the client indicated by the received login event of the input stream;

in response to the determination that the public key that was used for the authentication of the client by the host was not also used by the host to authenticate the client prior to the authentication of the client indicated by the received login event of the input stream, determine, based on the plurality of authorized public keys provided by the authorized source to the provider network, that the public key that was used for the authentication of the client by the host is an unauthorized public key; and in response to a determination that the public key is an unauthorized public key, send, to an endpoint, an indication based on the determination that the public key is unauthorized.

16. The one or more storage media as recited in claim 15, wherein to determine that the public key is an unauthorized public key, the program instructions when executed on or across the one or more processors further cause the one or more processors to:

determine that none of the plurality of authorized public keys matches the public key.

17. The one or more storage media as recited in claim 15, the program instructions when executed on or across the one or more processors further cause the one or more processors to:

receive another login event of the input stream, wherein the other login event comprises another public key that was provided by another client to another of the hosts for authentication of the other client;

determine that the other public key was not previously used by the other host to authenticate the client; and determine, based on the plurality of authorized public keys, that the other public key is an unauthorized public key.

18. The one or more storage media as recited in claim 15, wherein the program instructions when executed on or across the one or more processors further cause the one or more processors to:

receive another login event of the input stream, wherein the other login event comprises another public key that was provided by another client to another of the hosts for authentication of the other client;

determine that the other public key was previously used by the host to authenticate the client;

determine, based on satisfaction of one or more criteria, that the other login event is an anomalous event; and in response to the determination that the login event is an anomalous event, send, to the endpoint, an indication based on the anomalous event.

19. The one or more storage media as recited in claim 18, wherein the one or more criteria comprises:

a geographic location of the client indicated by the login event is within one or more unauthorized locations, or an amount of time since the public key was previously used by the host to authenticate the client exceeds a threshold amount of time.

20. The one or more storage media as recited in claim 15, wherein the program instructions when executed on or across the one or more processors further cause the one or more processors to:

in response to a determination that the public key is an unauthorized public key, cause the host to be quarantined.

* * * * *